US012123223B2

(12) United States Patent
Zastrow et al.

(10) Patent No.: US 12,123,223 B2
(45) Date of Patent: Oct. 22, 2024

(54) ROLL-DOOR INTEGRATED LOCKING SOLUTION

(71) Applicants: Justin Zastrow, San Diego, CA (US); Ira Hayes, San Diego, CA (US)

(72) Inventors: Justin Zastrow, San Diego, CA (US); Ira Hayes, San Diego, CA (US)

(73) Assignee: Smart and Armor Protected, LLC, San Diego, CA (US)

(*) Notice: Subject to any disclaimer, the term of this patent is extended or adjusted under 35 U.S.C. 154(b) by 0 days.

(21) Appl. No.: 18/339,844

(22) Filed: Jun. 22, 2023

(65) Prior Publication Data

US 2023/0332438 A1 Oct. 19, 2023

Related U.S. Application Data

(63) Continuation of application No. 17/473,042, filed on Sep. 13, 2021, now Pat. No. 11,686,127, which is a continuation of application No. 16/252,879, filed on Jan. 21, 2019, now Pat. No. 11,118,375.

(60) Provisional application No. 62/620,307, filed on Jan. 22, 2018.

(51) Int. Cl.
*E05B 65/00* (2006.01)
*E05B 47/00* (2006.01)

(52) U.S. Cl.
CPC ...... *E05B 65/0021* (2013.01); *E05B 47/0012* (2013.01)

(58) Field of Classification Search
CPC .. E05B 65/0021; E05B 65/00; E05B 47/0012; E05B 2047/002; E05B 2047/0091; E05B 47/0603; Y10T 70/7062; Y10T 70/7102; Y10T 70/7107; Y10T 70/5978; Y10T 292/1021; Y10T 70/7113; Y10T 70/7119; Y10T 70/7124; Y10T 70/713
USPC .............................................................. 70/91
See application file for complete search history.

(56) References Cited

U.S. PATENT DOCUMENTS

| | | | | |
|---|---|---|---|---|
| 4,782,674 | A | 11/1988 | Johnson | |
| 5,040,390 | A | 8/1991 | Mistry | |
| 5,437,174 | A | 8/1995 | Aydin | |
| 5,715,715 | A | 2/1998 | Nunez | |
| 5,791,179 | A | 8/1998 | Brask | |
| 6,216,502 | B1 | 4/2001 | Cannella | |
| 10,344,501 | B2 | 7/2019 | Chang | |
| 10,619,382 | B2 | 4/2020 | Waugh | |
| 11,021,894 | B1 * | 6/2021 | Zastrow | E05B 47/0004 |
| 11,118,375 | B1 * | 9/2021 | Zastrow | E05B 65/0021 |
| 11,686,127 | B1 * | 6/2023 | Zastrow | E05B 63/0004 70/91 |
| 2005/0235711 | A1 | 10/2005 | Martin et al. | |
| 2007/0074550 | A1 | 4/2007 | Isaacs | |

(Continued)

*Primary Examiner* — Suzanne L Barrett
(74) *Attorney, Agent, or Firm* — Venjuris, P.C.

(57) ABSTRACT

A lock for overhead roll doors and particularly a retrofit lock that enables both manual and remote wireless locking and unlocking of a roll door. More specifically, a roll door lock having an interior plate with a cylinder lock aperture, a motorhead gear coupled to a motor and rotationally secured within the housing, and a controller functionally coupled to the motor, wherein the controller may be commanded to operate the motor to lock the roll door lock by causing a blocking coupler edge to reduce the diameter of a ball-pin aperture, and unlock the roll door lock by withdrawing the blocking coupler edge.

2 Claims, 5 Drawing Sheets

(56) References Cited

U.S. PATENT DOCUMENTS

| | | | |
|---|---|---|---|
| 2010/0251787 | A1 | 10/2010 | Dayanikli |
| 2015/0252591 | A1 | 9/2015 | Roatis |
| 2016/0153213 | A1 | 6/2016 | Huang |

* cited by examiner

ROLL-DOOR INTEGRATED LOCKING SOLUTION

FIELD OF THE INVENTION

The present invention relates to locks for overhead roll doors and particularly to a retrofit lock that enables both manual and remote wireless locking and unlocking of a roll door.

BRIEF DESCRIPTION OF THE DRAWINGS

The objects, features and advantages of the present invention will be more readily appreciated upon reference to the following disclosure when considered in conjunction with the accompanying drawings, wherein reference numerals are used to identify the components in the various views.

DESCRIPTION OF PREFERRED EMBODIMENTS

Figure 1:
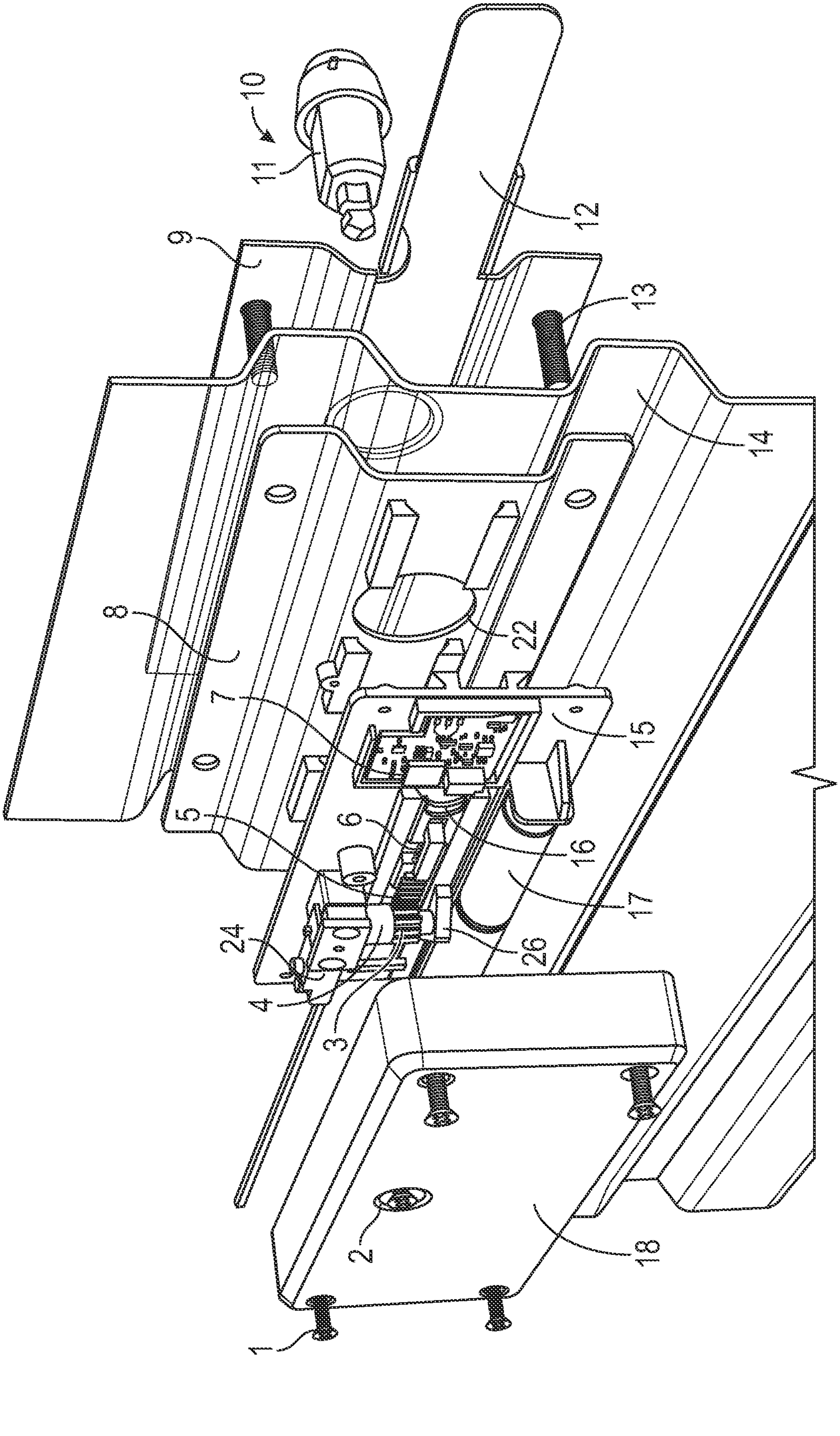
FIG. 1 illustrates an exploded view of an embodiment showing aspects of the invention.
Figure 2:
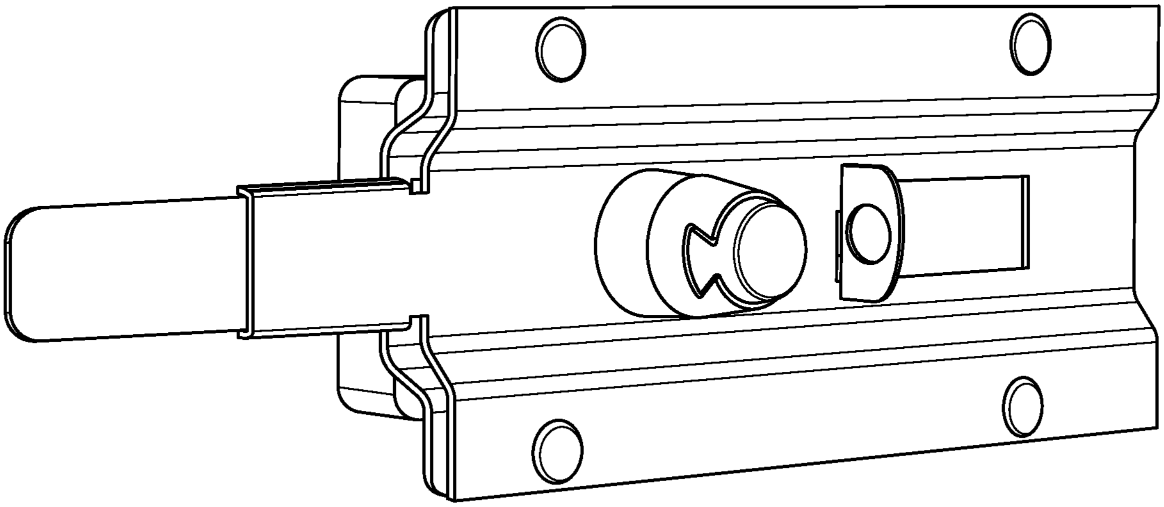
FIG. 2 illustrates a front perspective view of the embodiment.
Figure 3:
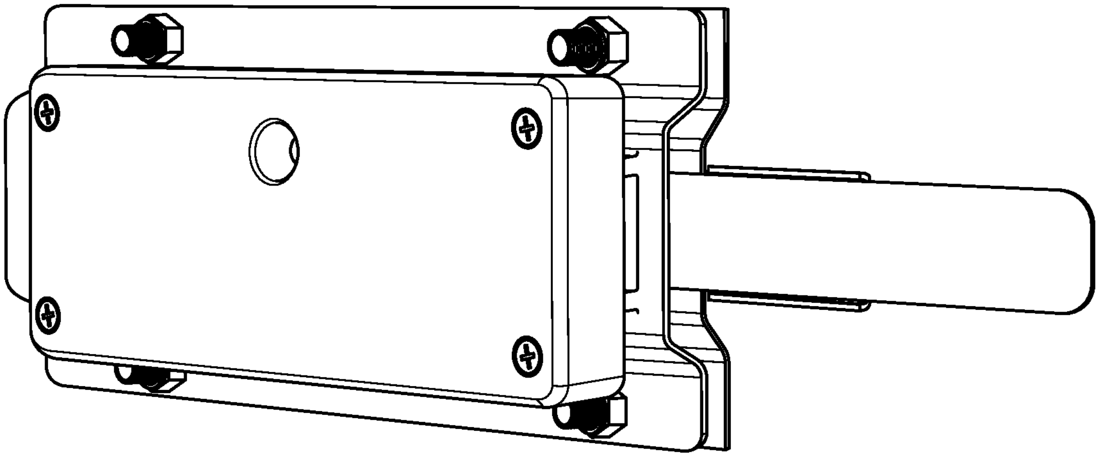
FIG. 3 illustrates a back perspective view of the embodiment.

Aspects of the invention are adaptable to embodiments having many different forms and functions related to the disclosure herein. The embodiment shown in the drawings and will be described herein in detail with the understanding that the present disclosure is to be considered as an exemplification of the principles of the invention and is not intended to limit the invention to the specific embodiment(s) illustrated. Systems consistent with the present invention may be alternately embodied, practiced, and/or carried out in various ways or implementations. Also, it is to be understood that the phraseology and terminology employed herein, as well as the abstract included below, are for the purposes of description and should not be regarded as limiting. Reference throughout this specification to "embodiment" should inform a person having ordinary skill that a particular feature, structure, or characteristic described in connection with the embodiment is included in at least one embodiment of the present invention but not necessarily in all embodiments. The features, structures, or characteristics of any embodiment of the present invention may be combined in any suitable manner and in any suitable combination with one or more other embodiments, including the use of selected features without corresponding use of other features. Modifications may be made to adapt an implementation of certain features to the essential scope and spirit of the present invention and certain features, limitations, or elements of each embodiment can be omitted or replaced with equivalents. It should be understood that other variations and modifications of the embodiments of the present invention described and illustrated herein are possible and part of the spirit and scope of the present invention. Finally, the disjunctive term "or" herein, is generally intended to mean "and/or", having both conjunctive and disjunctive meanings (i.e. not an "exclusive or" meaning), unless so indicated. And, as used in the description herein and throughout the claims that follow, "a", "an", and "the" should be interpreted as "at least one" and include plural references unless the context dictates otherwise.

Figure 4:
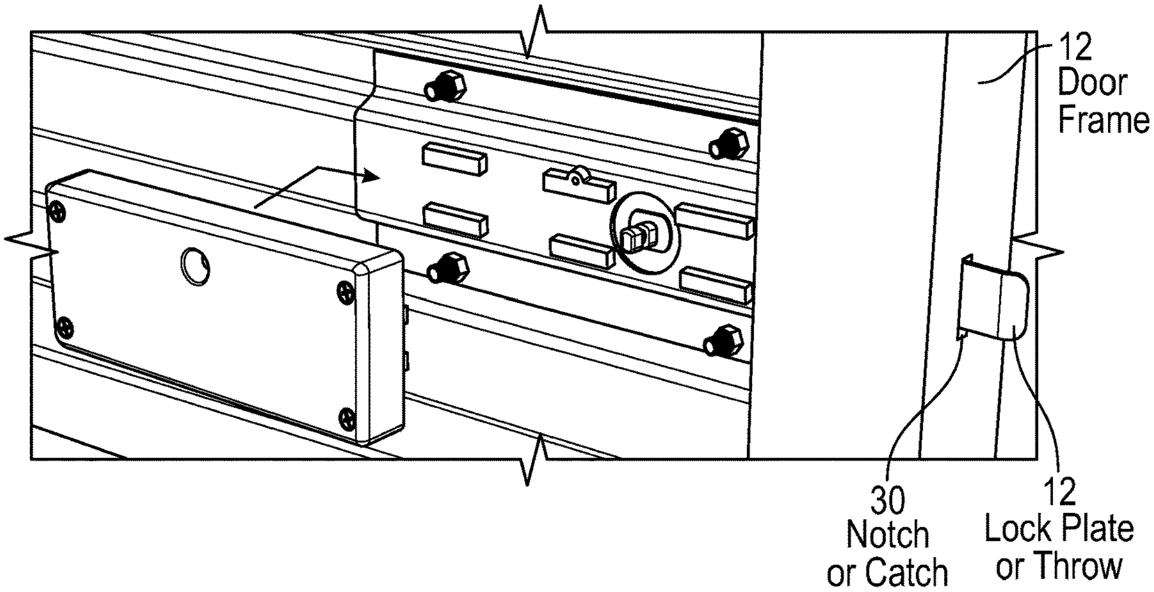
FIG. 4 illustrates a retrofit installation of the embodiment on a roll door lock.
Figure 5:
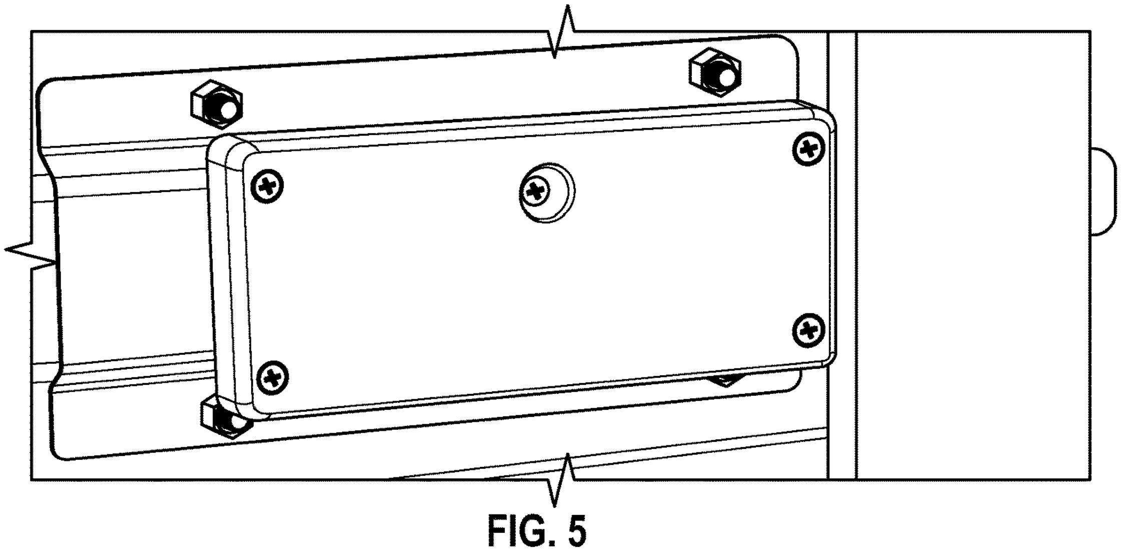
FIG. 5 illustrates back view showing the retrofit installation.
Figure 6:
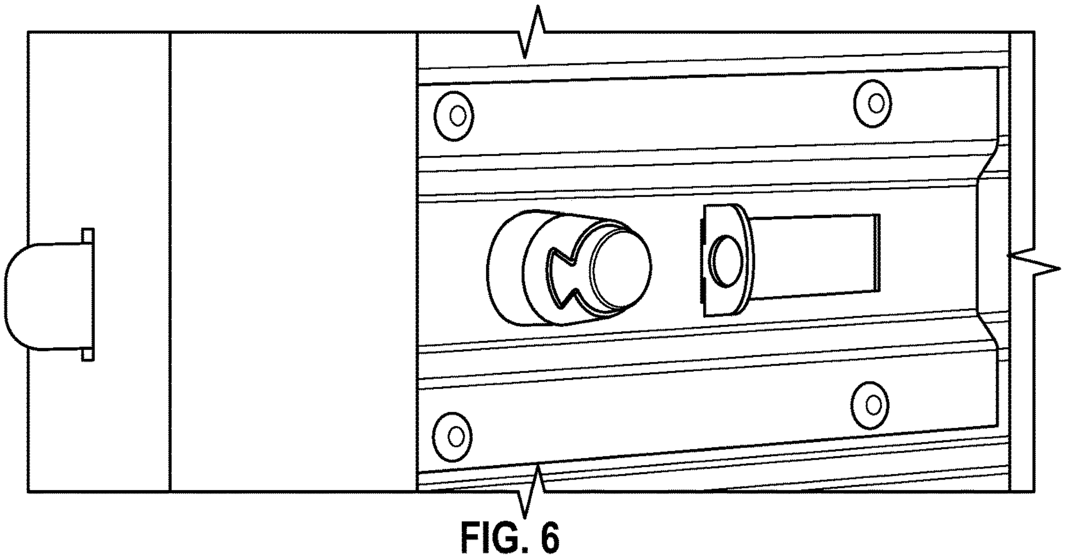
FIG. 6 illustrates the front or outside view showing the retrofit installation.
Figure 7:
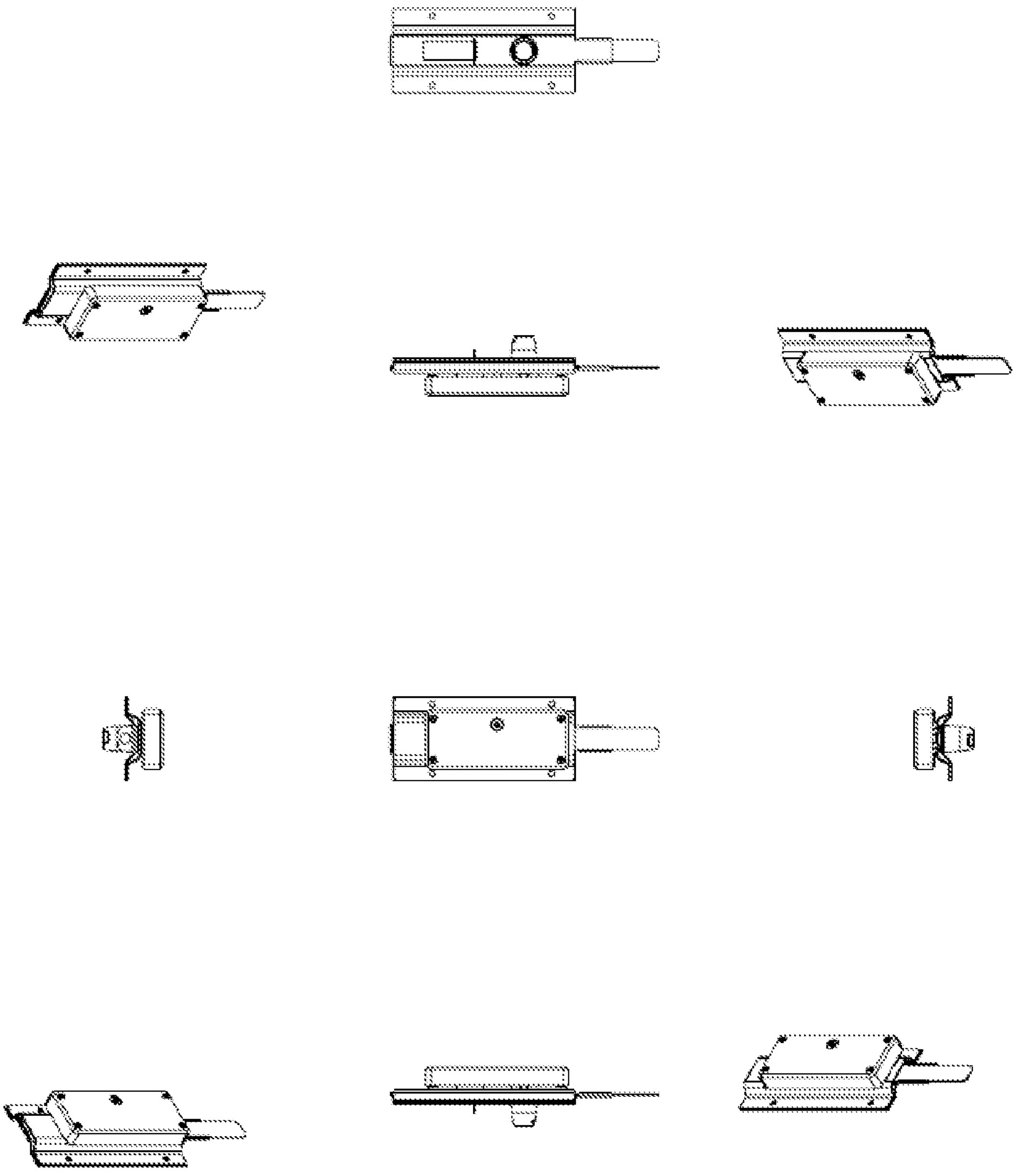
FIG. 7 illustrates top, side, back, front, and perspective views of the embodiment.
Figure 8:
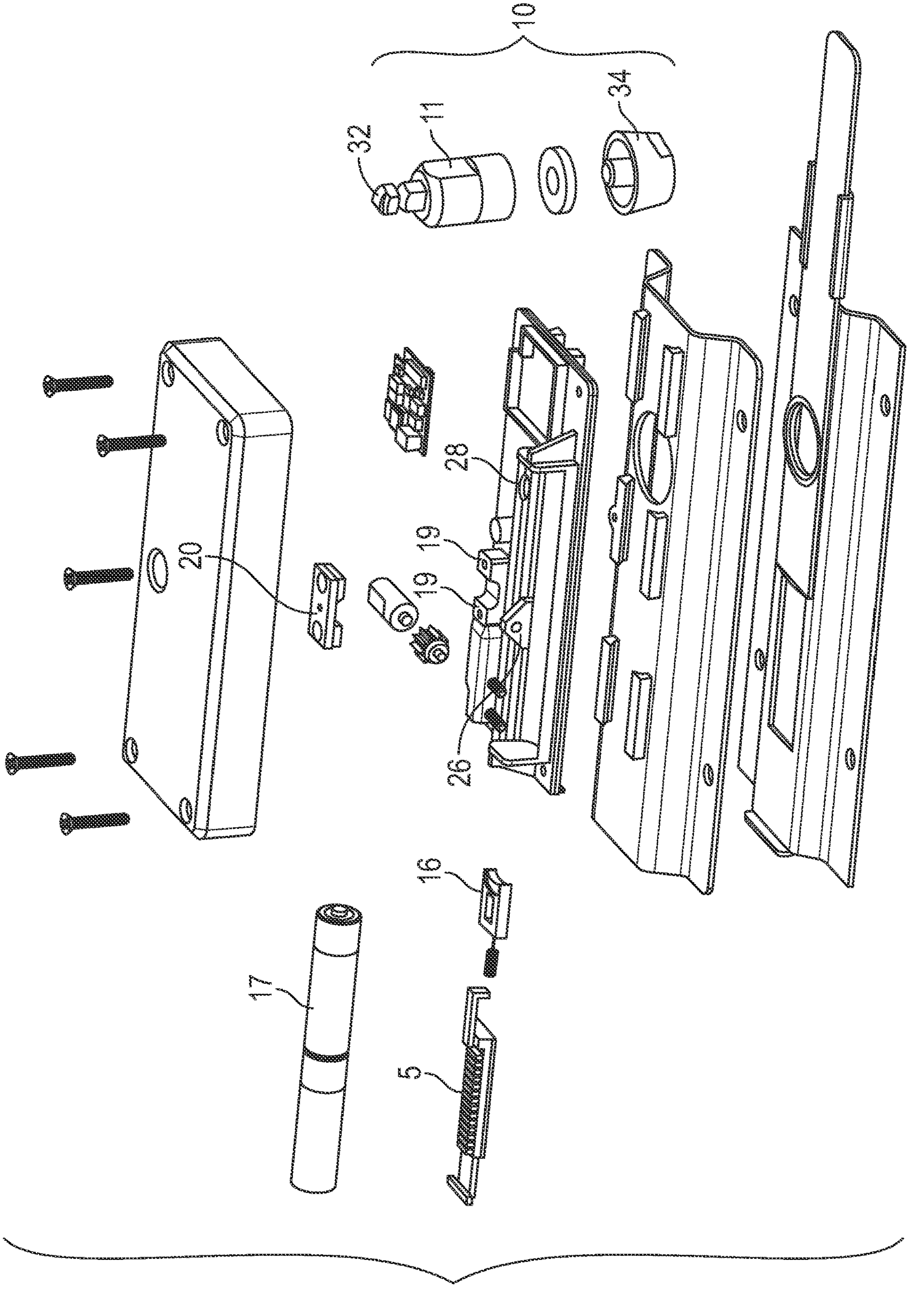
FIG. 8 illustrates another exploded view of the embodiment.

A prior art roll door lock may comprise a sliding throw or lock plate 12 that engages with or retracts from a catch or notch 30 in the roll door frame 12 (see FIGS. 4-6) to lock or unlock the roll door, respectively. As illustrated in FIG. 1, a cylinder lock aperture 22 penetrates the sliding lock plate 12 and an interior plate 9 and a roll door 14. A prior art cylinder lock (not shown) is received by the cylinder lock aperture 22 through the lock plate 12, interior plate 9, and door 14 to lock the door. Unlocking and removing the cylinder lock allows the cylinder lock to be removed from the cylinder lock aperture 22 and allows the sliding lock plate 12 to be slid away from or retracted from the catch or notch 30 to unlock the door. In a preferred embodiment, the roll door lock described herein is retrofit to, and uses components of, the prior art roll door lock except for the cylinder lock.

A retrofit roll door lock comprises attachment of the embodiment to the prior art roll door lock components that attach to the roll door 14. More particularly, the embodiment herein comprises a lock housing comprising an external body portion 18 and an internal body portion 15 that are attachable to the interior plate 9 and enclose within operable components of the present embodiment. See FIG. 1 The lock housing is rectangular shaped and dimensioned similarly to the interior plate 9 and has sufficient depth to enclose interior housing structures to enable a secured-assembly of interior components of the preferred lock, including a circuit board 7, an extractor 5, and extractor spring 6, a motor 4, a motorhead gear 3, and a power source 17.

The interior housing structure includes a motor clamp 24, a motor axle support 26, and border structure to secure the interior components in place within the housing. The motor clamp 24 includes support segments 19 that extend from the internal body portion 15 of the housing and a top-clamp 20 that traverses the support segments and under which the motor 4 is secured to the internal body portion 15. A motor axle support 26 supports and suspends the motorhead gear 3 axle above the interior surface of the housing internal body portion 15. The internal body portion 15 further includes a ball-pin aperture 28 positioned in the path of the cylinder lock aperture 22.

An extractor 5 is a substantially flat linear gear that engages the motorhead gear 3 and in the preferred embodiment is functionally engaged with motorhead gear 3 and secured between the motorhead gear 3 and the interior surface of the housing internal body portion 15. Accordingly, concentric rotation of the motorhead gear 3 by the motor 4 operates as a cam and translates or slides the extractor 5 longitudinally across the internal body portion 15. The extractor 5 is coupled, such as by a hook, to a substantially rectangular plate with a blocking coupler edge 16. A preferred blocking coupler edge 16 comprises a semi-circle or ring that slides adjacently along the internal body portion 15 until it obscures the ball-pin aperture 28 and effectively reduces the diameter of the ball-pin aperture 28.

An access pin 10 comprising a handle 34 and a cylindrical firewall 11 with a bulbous or ball-pin end 32 is dimensioned to be insertable into the cylinder lock aperture 22 such that the ball-pin end 32 penetrates the ball-pin aperture 28. When the lock is unlocked, the blocking coupler edge 16 of the ball-pin aperture 28 is retracted by operation of the motor 4 and motorhead gear 3 causing the extractor 5 to retract the blocking coupler edge 16. Conversely, when the lock is locked, the blocking coupler edge 16 is slid to obscure the ball-pin aperture 28 and effectively reduce the diameter of the ball-pin aperture 28 and prevent the ball pin end 32 of the access pin 10 from being removed from the ball-pin aperture 28. Moreover, an extractor spring 6 can be positioned against the plate of the blocking coupler edge 16 to bias the blocking coupler edge 16 into a default "locked" position of obscuring the ball-pin aperture 28.

The motor 4 is wirelessly controllable, such as by Bluetooth®, by a circuit board 7 having a controller operating a software process to receive commands from a user device and cause the motor 4 to lock or unlock the roll door 14. A power source 17, such as batteries powers the integrated and active circuitry and the motor 4.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents and all such modifications that fall within the scope of the claims.

What is claimed is:

1. A roll door lock for a roll door, the roll door having an interior plate with a cylinder lock aperture, the roll door lock comprising:

a ball-pin aperture aligned with the cylinder lock aperture;

a motorhead gear coupled to a motor and rotationally secured within a housing;

a linear cam gear extractor having a blocking coupler edge positioned adjacent to a housing aperture, the extractor functionally coupled to the motorhead gear to slide the extractor and blocking coupler edge adjacently along an internal body portion interior surface away from or towards the housing aperture;

an access pin having a ball-pin end, the ball-pin end insertable through the cylinder lock aperture and into the ball-pin aperture; and a controller functionally coupled to the motor;

wherein the controller may be commanded to operate the motor to lock the roll door lock by causing the blocking coupler edge to reduce the diameter of the ball-pin aperture, and unlock the roll door lock by withdrawing the blocking coupler edge.

2. The roll door lock of claim 1 further comprising a spring positioned between the linear cam gear extractor and the blocking coupler edge to push the blocking coupler edge into the ball-pin aperture.

* * * * *